United States Patent
Bastable et al.

(10) Patent No.: US 8,499,329 B2
(45) Date of Patent: Jul. 30, 2013

(54) POWER SAVING DEVICE

(75) Inventors: Ian Bastable, Fareham (GB); Bijal Shah, Slough (GB); Peter Yaxley, Southampton (GB)

(73) Assignee: Cisco Technology Inc., San Jose, CA (US)

( * ) Notice: Subject to any disclaimer, the term of this patent is extended or adjusted under 35 U.S.C. 154(b) by 752 days.

(21) Appl. No.: 12/451,989

(22) PCT Filed: May 27, 2008

(86) PCT No.: PCT/IB2008/052070
§ 371 (c)(1),
(2), (4) Date: Feb. 22, 2010

(87) PCT Pub. No.: WO2008/155681
PCT Pub. Date: Dec. 24, 2008

(65) Prior Publication Data
US 2010/0141848 A1    Jun. 10, 2010

Related U.S. Application Data

(60) Provisional application No. 60/936,608, filed on Jun. 21, 2007.

(51) Int. Cl.
| G06F 1/00 | (2006.01) |
| G06F 1/26 | (2006.01) |
| G06F 1/32 | (2006.01) |
| H04N 7/00 | (2006.01) |
| H04N 11/00 | (2006.01) |
| H04N 5/63 | (2006.01) |
| H04N 7/16 | (2006.01) |

(52) U.S. Cl.
USPC ........... 725/151; 725/139; 348/460; 348/730; 713/300; 713/310; 713/324; 713/340

(58) Field of Classification Search
USPC .................. 348/460, 552, 730; 725/130, 131, 725/132, 153, 139, 151; 713/300, 310, 324, 713/340
See application file for complete search history.

(56) References Cited

U.S. PATENT DOCUMENTS
5,506,790 A * 4/1996 Nguyen ...................... 700/286
6,292,233 B1 9/2001 Erba et al.
(Continued)

FOREIGN PATENT DOCUMENTS
| DE | 19710944 A1 | 9/1998 |
| EP | 0 975 109 A1 | 1/2000 |
(Continued)

OTHER PUBLICATIONS
"The Big Idea—As Seen on TV—Save Energy" (Jan. 30, 2007) available at http://web/archive.org/web/20070120065459/http://www.standbyplug.com.
(Continued)

*Primary Examiner* — Hai V Tran
(74) *Attorney, Agent, or Firm* — Husch Blackwell LLP

(57) ABSTRACT

A power saving device is described that is disposed in use between a further device and a mains power supply for supplying power to the further device. The power saving device includes: a communications channel input connected in operation to a communications channel output of the further device. The communications channel input is operable to receive control instructions from the further device. The power saving device also includes: a switch for disconnecting the further device from the mains power supply in response to the control instructions received from the further device; and an internal power source operable to provide power to the power saving device.

21 Claims, 1 Drawing Sheet

U.S. PATENT DOCUMENTS

| | | | |
|---|---|---|---|
| 6,337,719 B1 * | 1/2002 | Cuccia | 348/731 |
| 2002/0124266 A1 * | 9/2002 | Blanchard | 725/130 |
| 2006/0285024 A1 | 12/2006 | Chou et al. | |
| 2007/0132890 A1 | 6/2007 | Huang et al. | |

FOREIGN PATENT DOCUMENTS

| | | |
|---|---|---|
| EP | 0 982 941 A1 | 3/2000 |
| EP | 1 223 752 A2 | 7/2002 |
| EP | 1223752 A2 * | 7/2002 |
| EP | 1 746 734 A2 | 1/2007 |
| GB | 2427515 A * | 12/2006 |
| JP | 11191925 | 7/1999 |
| JP | 2000324689 | 11/2000 |
| WO | WO 98/01994 | 1/1998 |
| WO | WO 01/30070 A1 | 4/2001 |
| WO | WO 2004/057862 A1 | 7/2004 |
| WO | WO 2004057862 A1 * | 7/2004 |
| WO | WO 2007/138306 A1 | 12/2007 |

OTHER PUBLICATIONS

"PC Pro Recommended" (Apr. 18, 2005), printed from www.pcpro.co.uk.

"The Sava Socket—Product Information—How it works" (Electratech 2006), available at www.thesavasocket.co.uk.

"Standby Saver" May 9, 2007), available at http://www.standby-saver.co.uk/standby_saver_home.htm.

"What's Your Big Idea? —Karl Dorn" (Sep. 9, 2006), printed from www.vodafonesmailbusiness.co.uk.

"X10 (industry standard)" (Wikipedia, Apr. 10, 2007), available at http://en.wikipedia.org/wiki/X10_%28industry_standard%29.

Mar. 7, 2011 Office Communication in connection with prosecution of EP 08 763 113.1.

* cited by examiner

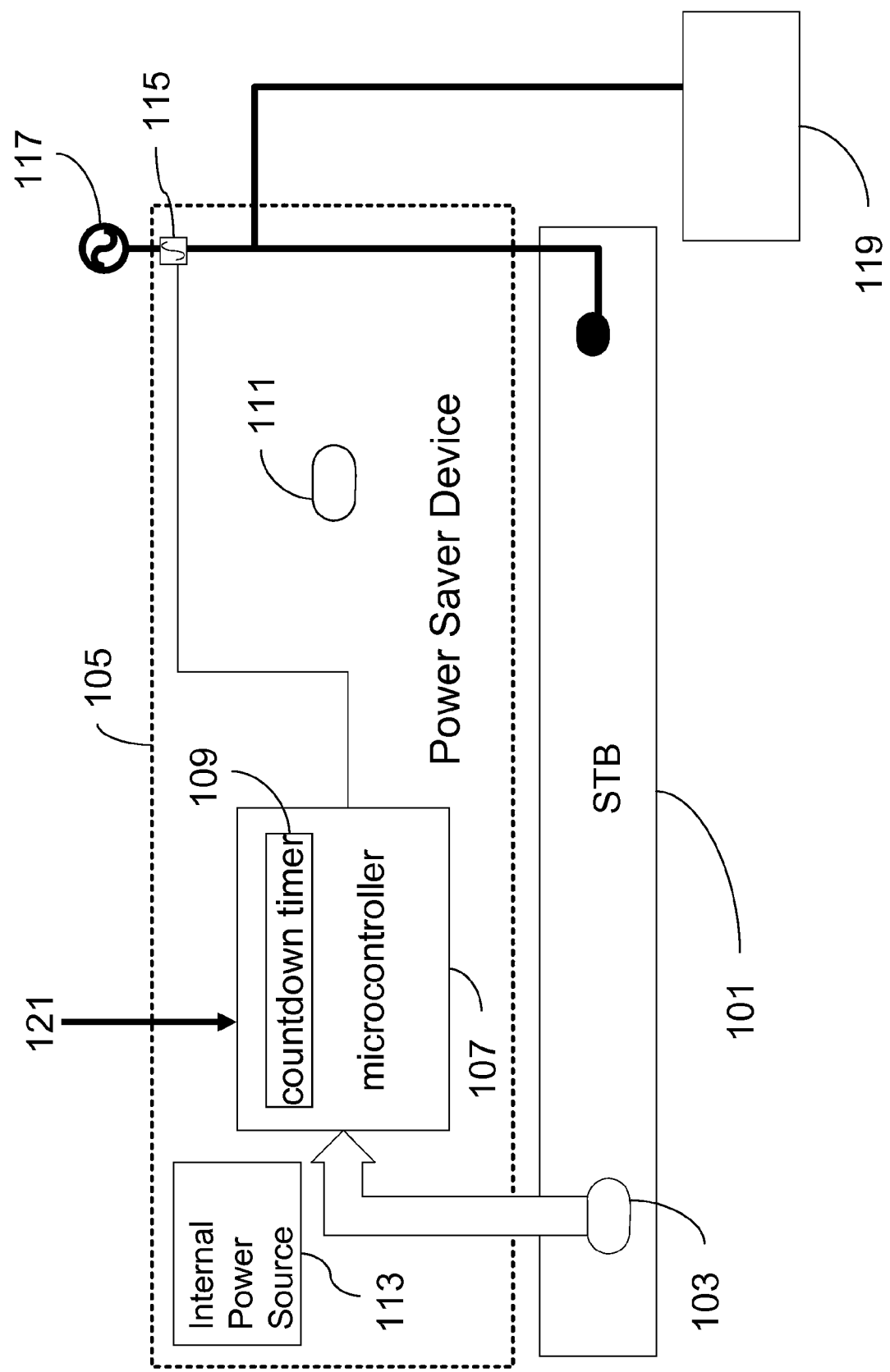

POWER SAVING DEVICE

The present application is a 35 USC §371 application of PCT/IB2008/052070, filed on 27 May 2008 and entitled "Power Saving Device", which was published on 24 Dec. 2008 in the English language with International Publication Number WO 2008/155681 A1, and which relies for priority on US Provisional Patent Application Ser. No. 60/936,608, filed on 21 Jun. 2007.

FIELD OF THE INVENTION

This invention relates to a power saving device. More specifically, it relates to power saving devices that can be used with existing equipment in order to lower the overall power consumption of the equipment.

BACKGROUND OF THE INVENTION

Some consumer electronics equipment has already been designed with power saving features. A "standby" mode is a power saving mode that reduces electrical power consumption when the electronic device is idle. Standby mode places the electronic device into a state of "waiting for a power-up command". However, power consumption can still be considerable in such a "standby" mode, even though the equipment is not in active use.

Canal+ introduced a digital set-to-box (STB) having a true power cutoff mode built into it meaning that the STB could be completely powered down, thus consuming no power.

However, the majority of consumer electronics equipment currently marketed are not designed with such a power cutoff feature and therefore various after-market devices are available that provide some degree of power control. Such devices include the Standby Saver (www.standby-saver.co.uk/standby-_saver_home.htm) and The Savasocket (www.the-savasocket.co.uk/savasocket.html). These are timer-based, mains-power control devices that the consumer equipment is plugged into. The device turns the power on or off according to a preset timer that forms part of the device.

International patent application published as WO 2004/057862 describes an appliance, such as a set top box, that has an ON power mode and a STAND BY power mode and that is in communication with a television set. A parameter of an operating signal associated with the television set is monitored and the value of the parameter is compared with predetermined values at which the set top box is desired to be either operative (ON power mode) or inoperative (STAND BY power mode). When a predetermined value of the parameter is detected, the current power mode of the set top box is evaluated and, if necessary, changed. Power supply to the TV set, operating frequency of a local oscillator/mixer in the TV set or the presence of a line scan signal from the TV set rate can be monitored to determine whether the appliance should be turned on or off.

U.S. Pat. No. 6,292,233 describes a device controller that controls access to a device, such as a television, and that has a power input for receiving power and a data input for receiving control data. When in standby mode, the device controller disconnects the device from a power source, such as the AC mains of the building in which the device is situated. As a result, in standby mode only the device controller is powered, which uses much less power than prior art devices in standby mode. The device controller includes an input device structured to provide control data based on control instructions received from a user, a power switch coupled between a power source and the device power input, and a data coupler coupled to the device data input and structured to convert electrical data into non-electrical data and back to the electrical data for delivery to the device data input. The device controller also includes a controller structured to cause the data coupler to provide the control data to the device data input, decode the control data, and if the control data indicates that the user desires to turn on the device when in standby mode, then causes the power switch to deliver power from the power source to the device power input.

European patent application EP0975109 describes a digital broadcasting method for transmitting required information to minimize the stand-by power in an apparatus for receiving a digital broadcast, and the receiving apparatus. Before transmitting utilization data for an apparatus at the receiving end from a transmitting end, transmission schedule information including the kind of the utilization data, a receiver identifier indicating a target to which the utilization data is to be transmitted, and the transmission time at which the utilization data is to be transmitted, is multiplexed in a transport stream of a service (program) to be transmitted.

SUMMARY OF THE INVENTION

Many items of mains powered, electronic equipment are designed for continuous operation and as such they consume power, even when placed in a "standby" power state. A typical example of this is a digital television set top box (STB), where the broadcast television operator requires that entitlement management messages (EMM) and schedule information are received by the STB even when the STB is put into "standby" state by the user in order to facilitate a fast "wakeup from standby" time for the STB. The STB may also have digital video recorder (DVR) functionality and in order to allow for features such as rewind of the live television broadcast, the STB may also be continually caching the television broadcast. This means that the STB has to be continually powered and have appropriate components operating at all times in order to retrieve the relevant information from the television broadcast.

However, the requirement for such STBs to be in continuous operation is not fixed as changes to the broadcast system or a user preference to completely power down the STB may remove the requirement. Therefore, the situation can arise where an item of electronic equipment is consuming power unnecessarily as it was not designed to fully power down without user intervention.

There is provided in accordance with embodiments of the present invention a power saving device disposed in use between a further device and a mains power supply for supplying power to the further device, the power saving device including: a communications channel input connected in operation to a communications channel output of the further device, wherein the communications channel input is operable to receive control instructions from the further device; a switch for disconnecting the further device from the mains power supply in response to the control instructions received from the further device; and an internal power source operable to provide power to the power saving device.

In some embodiments the power saving device further includes a signal receiver operable to receive signals initiating the reconnection of the further device to the mains power supply and the powering up of the further device.

In some embodiments, the signal receiver includes an infra-red receiver.

In some embodiments, the infra-red receiver is operable to receive infra-red signals from a remote control associated with the further device.

In some embodiments, the infra-red receiver is enabled when the further device is disconnected from the mains power supply.

In other embodiments, the signals include Ethernet signals.

In other embodiments, the signals include PSTN signals.

In other embodiments, the signals include RF signals.

In some embodiments, the RF signals initiating the reconnection of the further device are modulated with standard RF signals being transmitted to the further device.

In other embodiments, the RF signals initiating the reconnection of the further device are overlaid on standard RF signals being transmitted to the further device.

In some embodiments, the RF signals are transmitted out of band to said standard RF signals.

In some embodiments, the internal power source includes a battery.

In other embodiments, the internal power source includes a rechargeable power source.

In some embodiments, the power saving device reconnects the further device to the mains power supply in order to recharge the rechargeable power source.

In some embodiments, the rechargeable power source includes a rechargeable battery.

In other embodiments, the rechargeable power source includes a capacitor.

In other embodiments, the internal power source includes a mains transformer.

In some embodiments, the power saving device further includes a timer, and the control instructions include a time, measurable using the timer, at which the further device is to be reconnected to the mains power supply.

In some embodiments, the communications channel input includes a serial communications channel input.

In some embodiments, the serial communications channel input includes an RS-232 input.

In other embodiments, the serial communications channel input includes a universal serial bus input.

In some embodiments, the further device includes a digital television set top box.

There is also provided in accordance with further embodiments of the present invention a power saving device disposed in use between a further device and a mains power supply for supplying power to the further device, the power saving device including: communications channel input means connected in operation to communications channel output means of the further device, wherein the communications channel input means are for receiving control instructions from the further device; switching means for disconnecting the further device from the mains power supply in response to the control instructions received from the further device; and internal power means for providing power to the power saving device.

BRIEF DESCRIPTION OF THE DRAWING

The present invention will be understood and appreciated more fully from the following detailed description, taken in conjunction with the drawings in which FIG. 1 is a simplified pictorial illustration of a power saving system constructed and operative in accordance with embodiments of the present invention.

DETAILED DESCRIPTION OF EMBODIMENTS

Embodiments of the present invention will now be described with reference to a digital television set top box (STB). Referring to FIG. 1, a STB 101 is shown. STB 101 is software programmable and has a communication channel 103 (e.g. a serial RS232 communication channel, universal serial bus (USB), WiFi, Bluetooth etc.) enabling it to communicate with a power saving device 105. STB 101 is connected to a mains power supply (sometimes also called an outlet power supply or line power supply) via power saving device 105.

Power saving device 105 contains a microcontroller 107 for controlling operation of power saving device 105, a countdown timer 109, an infra-red (IR) receiver port 111 enabling power saving device 105 to receive IR commands from an IR remote control, an internal power source 113 and a latching mains power switch relay 115. Internal power source 113 provides the power that power saving device 105 needs to operate and could comprise, for example, a rechargeable battery connected via the communications channel, RF output or another connector on the back panel of the STB, a large capacity capacitor, a small mains transformer, a replaceable battery etc. Other internal power sources will be apparent to someone skilled in the art. Power relay 115 enables power saving device 105 to cut off STB 101 from a mains power supply 117. Although described as a latching mains power switch relay, someone skilled in the art will realize that any form of switching means that can disconnect STB 101 from mains power supply 117 could be used.

On reception of a power down event (e.g. a user of STB 101 pressing a standby button on a remote control associated with STB 101), the software of STB 101 makes itself ready for a clean power down by flushing any data and caching any essential information in non-volatile storage (as described, for example, in International Patent Application PCT/GB2007/001983 of NDS Technologies France (published as WO 2007/138306). STB 101 then ignores any further requests from the user except a request to cancel the power down.

Then, the software of STB 101 sends power saving device 105 a sequence of commands via the communications channel.

Then microcontroller 107 of power saving device 105 interprets the command sequence received from STB 101.

The command sequence may include a wake-up alarm time (e.g. if there are scheduled reminders in the software's viewing planner application of STB 101). In this case, microcontroller 107 sets countdown timer 109 to wake up (power up) STB 101 at the appointed time.

Then microcontroller 107 powers down STB 101 by switching power relay 115 thereby cutting off the mains power to STB 101.

Then microcontroller 107 enables IR receiver 111 to detect requests from the user (e.g. the user pressing a power up button on the remote control.)

Microcontroller 107 then puts itself into a power saving mode, but countdown timer 109 continues and IR receiver 111 remains active.

Microcontroller 107 is reactivated on completion of the countdown timer, or if power saving device 105 receives an IR signal from the user's remote control indicating that the user wants to turn on STB 101.

Microcontroller 107 then disables IR receiver 111 on power saving device 105 and powers up STB 101 by switching power relay 115 and reapplying mains power to STB 101.

STB 101 boots up (restarts) as it would normally do when mains power is applied to it after having been in a powered down state.

The software on STB 101 determines the reason for the wake up by examining the schedule information and the current time. The software on STB 101 may also interrogate microcontroller 107 for this information.

In cases where internal power source 113 comprises an ephemeral, rechargeable source of power, power saving device 105 wakes up STB 101 in order to recharge internal power source 113.

STB 101 attached to power saving device 105 may also be connected to related equipment. For example, a display device 119 could also be attached to STB 101. In this case, the display device 119 may also be connected to a mains power supply 117 via power saving device 105 so that both STB 101 and the display device 119 are powered down simultaneously. The display device 119 may remain powered down while STB 101 is active. For example, in the case where STB 101 was powered up to perform a recording based on a preset time, the display device 119 may remain powered down until the user presses a remote control button to signify that the display device 119 should be powered up again.

Additional sources of stimuli 121 may exist aside from a remote control for STB 101, IR receiver 111, or internal countdown timer 109.

For example, a PSTN or Ethernet line may be used to signal to power saving device 105 that it should wake up STB 101 in order to allow STB 101 to receive appropriate signaling from an external third party. This can allow, for example, a television broadcaster to signal STB 101 that new entitlement data is about to be delivered or to add a new recording event to the recording schedule of STB 101. When a PSTN line is used, a Caller ID (also called caller identification, CID, or calling number identification, which is a telephone service that transmits a caller's number to the called party's equipment during the ringing signal or when the call is being set up but before the call is answered) can be used to identify the external third party. In this way, only certain, predetermined telephone numbers can be made to wake up the STB without causing all telephone calls to wake up the STB.

An RF feed may be used in a similar manner to signal a wakeup from an external third party. A standard RF signal may be further modulated or overlaid with additional signaling (e.g. an out of band signal) which does not affect the standard signal. The additional signaling can be used by an external third party in a similar manner to a PSTN or Ethernet line but may not require any additional wiring to power saving device 105.

According to embodiments of the present invention, a power saving device 105 has been described that can be used with electronic equipment that was not originally designed to be fully powered down without user intervention. Using an existing communications channel of the electronic equipment, the power saving device 105 can power down the electronic equipment. Power saving device 105 contains more than simply a preset timer as a stimulus for waking up the electronic equipment. Power saving device 105 offers an after market means of totally powering down electronic equipment.

According to embodiments of the present invention, an add-on device that can be used with mains powered electronic equipment (such as STBs) to provide a power saving solution has been described. The device is controllable by the electronic equipment that is plugged into it and can be operated using other stimuli and/or a preset timer. The device can be connected to the electronic equipment via a communications channel (e.g. serial (RS232), USB, etc.) to allow the electronic equipment to program the device.

The device can provide a controlled electrical means for the electronic equipment to fully power down by cutting of the mains supply to the electronic equipment on request via the communications channel. The device allows reactivation of the electronic equipment by re-establishing the mains power supply to the electronic equipment. The reactivation can take place at a known time or through another source of stimulus, such as infra-red remote control or power recharge cycle (in the case where the device is powered by a rechargeable battery or a capacitor), or other mechanisms (as were described above). The electronic equipment is typically quick to boot (start/restart) from a completely powered down state in order to obtain the optimal power saving.

The device can be programmed by the connected electronic equipment rather than via a remote control associated with the electronic equipment. The device can enable a controlled shutdown of the electronic equipment, and can also allow a controlled wake-up alarm timer to be set. The device can also allow interruption of the wake-up alarm timer by a stimulus such as remote control, PSTN line, Ethernet, RF signaling, etc. An external supplier (e.g. a television broadcaster in the case where the electronic equipment is a STB) can 'stimulate' the electronic equipment in order to initiate the controlled wake-up (e.g. to indicate data for the electronic equipment is due to be delivered and the electronic equipment needs to be active in order to receive it.)

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A power saving device disposed in use between a digital television set top box and a mains power supply for supplying power to said set top box, said power saving device comprising:
   a communications channel input connected in operation to a communications channel output of said set top box, wherein said communications channel input is operable to receive control instructions from said set top box in response to a request from a user of said set top box to place said set top box into a standby mode;
   a switch for fully powering down said set top box by disconnecting said set top box from said mains power supply in response to said control instructions received from said set top box;
   a signal receiver operable to receive signals from an external third party, said signals initiating the reconnection of said set top box to said mains power supply and the powering up of said set top box; and
   an internal power source operable to provide power to said power saving device.

2. The power saving device of claim 1, wherein said external third party comprises a television broadcaster, and said signals initiating the reconnection of said set top box to said mains power supply and the powering up of said set top box comprise signals indicating that new entitlement data is about to be delivered or that a new recording event is to be added to a recording schedule of said set top box.

3. The power saving device of claim 1, wherein said signals comprise Ethernet signals.

4. The power saving device of claim 1, wherein said signals comprise PSTN signals.

5. The power saving device of claim 1, wherein said signals comprise RF signals.

6. The power saving device of claim 5, wherein said RF signals initiating the reconnection of said set top box are modulated with standard RF signals being transmitted to said set top box.

7. The power saving device of claim 5, wherein said RF signals initiating the reconnection of said set top box are overlaid on standard RF signals being transmitted to said set top box.

8. The power saving device of claim 7, wherein said RF signals are transmitted out of band to said standard RF signals.

9. The power saving device of claim 1, wherein said internal power source comprises a battery.

10. The power saving device of claim 1, wherein said internal power source comprises a rechargeable power source.

11. The power saving device of claim 10, wherein said power saving device reconnects said set top box to said mains power supply in order to recharge said rechargeable power source.

12. The power saving device of claim 10, wherein said rechargeable power source comprises a rechargeable battery.

13. The power saving device of claim 10, wherein said rechargeable power source comprises a capacitor.

14. The power saving device of claim 1, wherein said internal power source comprises a mains transformer.

15. The power saving device of claim 1, further comprising a timer, and wherein said control instructions include a time measurable using said timer, at which time said set top box is to be reconnected to said mains power supply.

16. The power saving device of claim 1, wherein said communications channel input comprises a serial communications channel input.

17. The power saving device of claim 16, wherein said communications channel input comprises an RS-232 input.

18. The power saving device of claim 16, wherein said communications channel input comprises a universal serial bus input.

19. An apparatus for power saving disposed in use between a digital television set top box and a mains power supply for supplying power to said set top box, said power saving device comprising:

communications channel input means connected in operation to communications channel output means of said set top box, wherein said communications channel input means are for receiving control instructions from said set top box in response to a request from a user of said set top box to place said set top box into a standby mode;

switching means for fully powering down said set top box by disconnecting said set top box from said mains power supply in response to said control instructions received from said set top box;

signal receiving means for receiving signals from an external third party, said signals initiating the reconnection of said set top box to said mains power supply and the powering up of said set top box; and internal power means for powering said power saving device.

20. The apparatus of claim 19, wherein said external third party comprises a television broadcaster, and said signals initiating the reconnection of said set top box to said mains power supply and the powering up of said set top box comprise signals indicating that new entitlement data is about to be delivered or that a new recording event is to be added to a recording schedule of said set top box.

21. A method of operating a power saving device, said power saving device being disposed in use between a digital television set top box and a mains power supply for supplying power to said set top box, said method comprising the steps of:

receiving control instructions from said set top box in response to a request from a user of said set top box to place said set top box into a standby mode;

responsive to said control instructions, fully powering down said set top box by disconnecting said set top box from said mains power supply;

receiving signals from an external third party; and responsive to said signals, initiating the reconnection of said set top box to said mains power supply and the powering up of said set top box.

* * * * *

UNITED STATES PATENT AND TRADEMARK OFFICE
CERTIFICATE OF CORRECTION

PATENT NO.       : 8,499,329 B2
APPLICATION NO. : 12/451989
DATED            : July 30, 2013
INVENTOR(S)      : Bastable et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this
Fifteenth Day of September, 2015

Michelle K. Lee
*Director of the United States Patent and Trademark Office*